United States Patent

[11] 3,594,741

| [72] | Inventor | Victor D. Ellison |
| | | Waverly, Pa. |
| [21] | Appl. No. | 733,127 |
| [22] | Filed | May 29, 1968 |
| [45] | Patented | July 20, 1971 |
| [73] | Assignee | The Bendix Corporation |

[54] ELECTROMECHANICAL TRANSDUCER
9 Claims, 7 Drawing Figs.

[52] U.S. Cl. .................................................. 340/196 R
[51] Int. Cl. ........................................................G08c 19/44
[50] Field of Search............................................ 340/196;
324/70 G, 70 E

[56] References Cited
UNITED STATES PATENTS

| 3,237,189 | 2/1966 | Wayman | 340/196 X |
| 3,501,664 | 3/1970 | Veillette | 324/70 CG |
| 1,798,592 | 3/1931 | Davis | 340/196 |
| 2,748,355 | 5/1956 | Jarvis | 340/196 X |
| 3,217,308 | 11/1965 | Maxwell | 340/196 |

*Primary Examiner*—Donald J. Yusko
*Attorneys*—Bauer and Seymour and Plante, Arens, Hartz & O'Brien ABSTRACT: An electromechanical transducer comprising a sealed error sensor and followup device having two concentric separately rotatable assemblies constructed to generate an electrical output signal only when one assembly is rotated relative to the other from a predetermined null or neutral position by a wind vane or comparable means. A servomotor is energized in response to the output signal and drives said other assembly through a gear train to cause it to followup and duplicate said relative movement to thus reestablish the null position relationship of the two assemblies. The servomotor may also drive potentiometers, synchros or the like an amount proportional to the movement of said assemblies from a predetermined reference position.

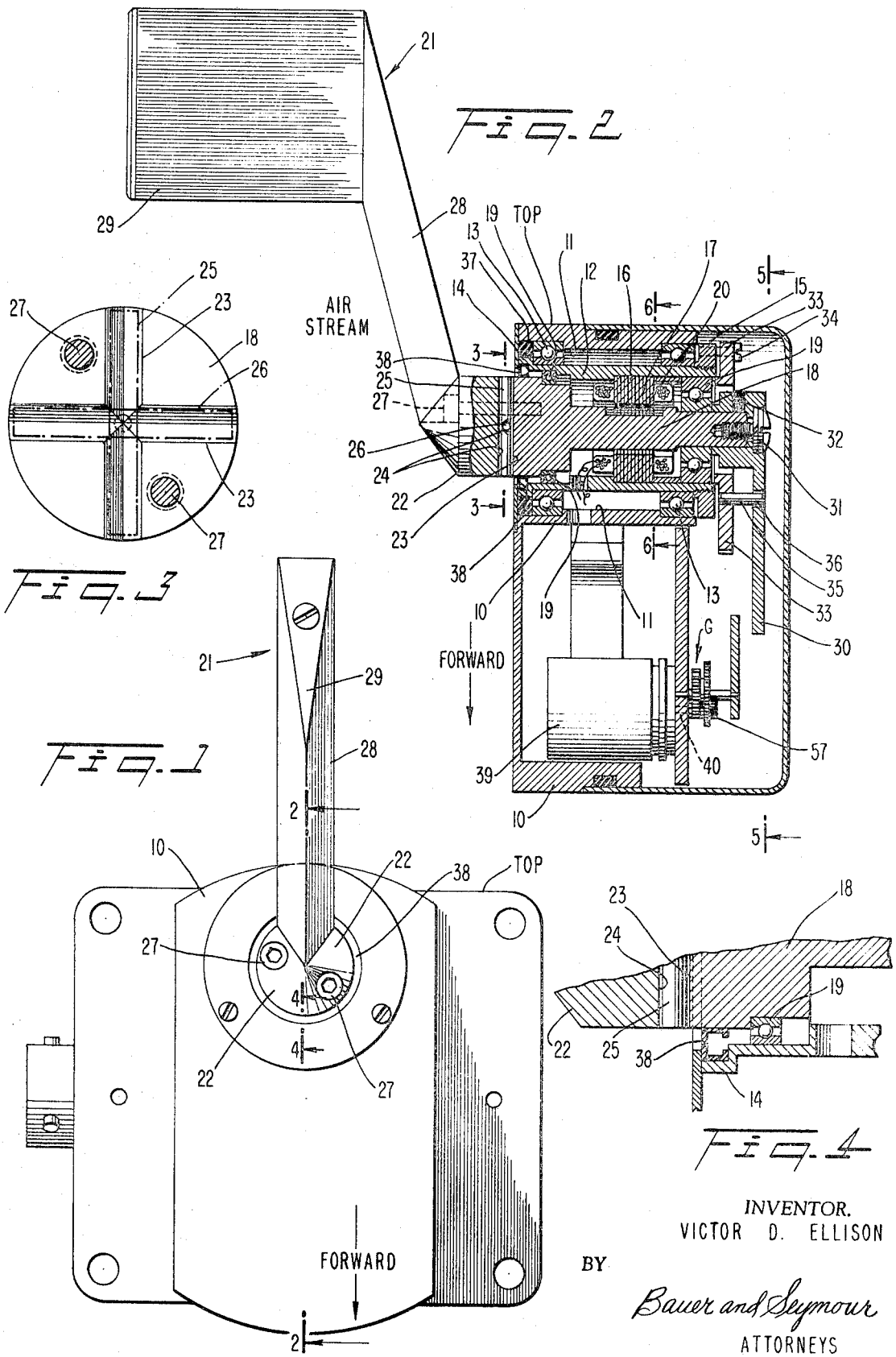

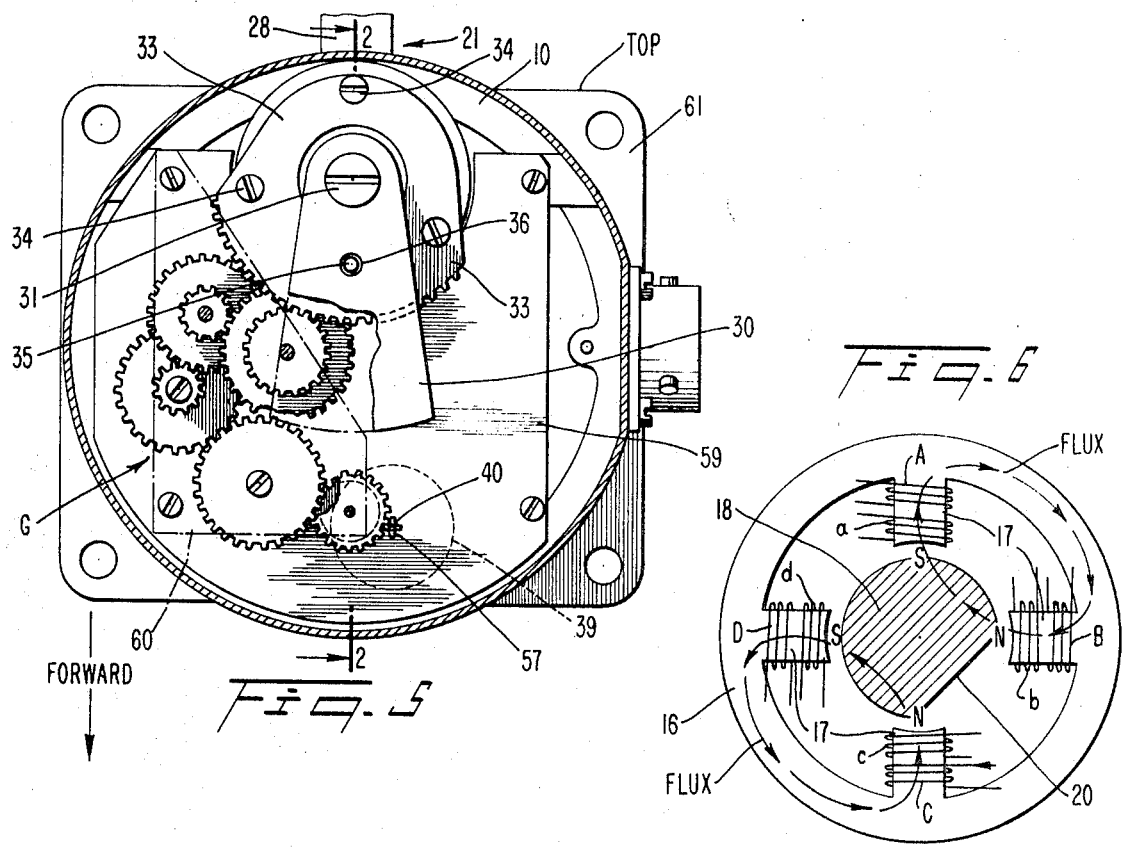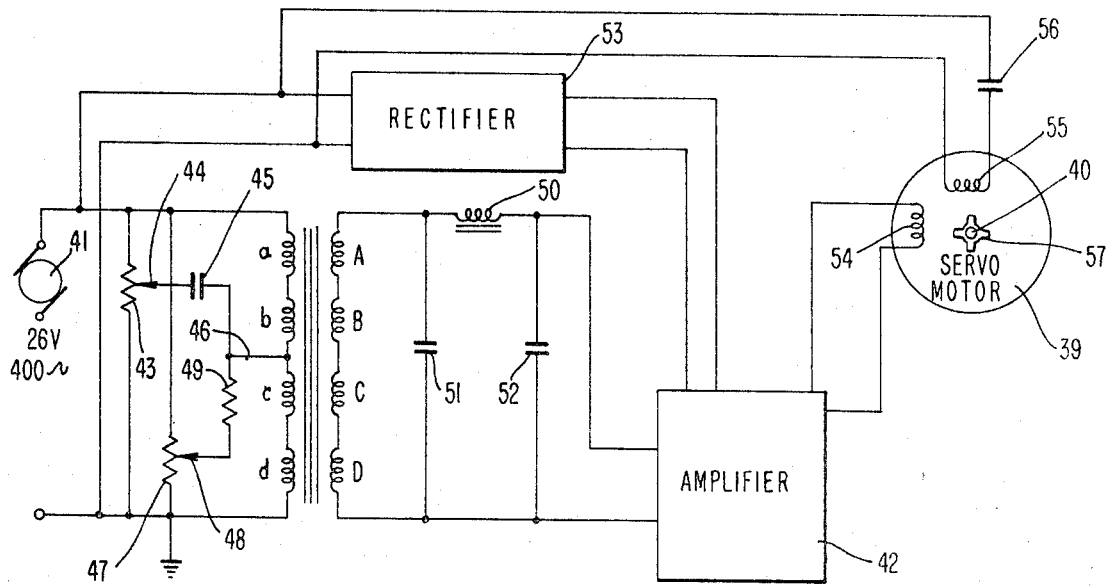

ELECTROMECHANICAL TRANSDUCER

This invention relates to motion sensing and transmitting devices and systems and more particularly to such devices and systems embodying an electrical induction-type transducer.

One of the objects of the present invention is to provide a novel transducer which operates on the inductive or transformer principle.

Another object of the invention is to provide a device of the above character comprising novel transducer means wherein motion-sensing elements having a very limited or restricted range of relative movement are capable of sensing movement of an element throughout a comparatively wide range.

A further object is to provide novel apparatus for inductively sensing small angular input movements throughout an arc of 360° and repeating such movements proportionally at other locations.

Still another object is to provide a novel motion-sensing and followup device in a servosystem.

A still further object is to provide an inductive transducer wherein concentric induction elements are permitted very limited relative movement whereby a highly efficient substantially frictionless seal may be provided for the annular clearance space between the elements without detrimentally affecting free relative movement thereof within the permitted range.

Another object is to provide a novel synchro embodying novel means for obtaining a null output for a range of mechanical positions of the rotor.

A further object is to provide a novel electromechanical transducer system comprising a variable rotary transformer with a servoed rotatable stator.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is an elevation view of one form of airstream responsive device according to the invention as seen from left to right in FIG. 2;

FIG. 2 is a sectional view taken on lines 2–2 of FIGS. 1 and 5 with part of the air vane shown in top plane view;

FIG. 3 is an enlarged scale view taken in the plane of line 3–3 of FIG. 2;

FIG. 4 is an enlarged scale sectional view taken on line 4–4 of FIG. 1;

FIG. 5 is a view taken in the plane of line 5–5 of FIG. 2;

FIG. 6 is an enlarged scale transverse sectional and schematic view of the rotor and stator of the error sensing unit as seen from the plane of line 6–6 of FIG. 2; and FIG. 7 is a schematic wiring diagram of a servoed system incorporating the device of FIG. 2.

A single embodiment of the invention is illustrated in the drawings, by way of example, in the form of a relative wind or angle of attack transducer for use on aircraft or the like. The device is designed for mounting on the fuselage of an aircraft with a vane extending into the airstream to sense variations in the direction of the wind relative to a reference plane and hence, to sense the angle of attack of the aircraft at the location of the vane. Movement of the vane relative to the aircraft is converted to an electrical signal by a novel error sensor unit which is also a followup device in a servosystem responsive to said signal.

In the exemplary form illustrated, the transducer embodying the invention comprises novel error-sensing means including a casing or frame 10 having a cylindrical bore or passage 11 in which a hollow shaft 12 is rotatably supported by low-friction bearings 13. Shaft 12 is axially positioned relative to the inner races of the bearings by an external flange 14 on one end and an internally threaded ring 15 forming an external flange on the other end. Secured within shaft 12 for angular movement therewith is an annular laminated core 16 (FIGS. 2 and 6) of magnetic material having four radially inwardly projecting poles 17 which carry primary windings $a$, $b$, $c$ and $d$ and secondary windings A, B, C and D to be more fully described below.

An inner shaft or rotor 18 of magnetic flux conducting material extends through hollow shaft 12 and is rotatably supported therein by low-friction bearings 19. Shaft 18 functions as a magnetic flux path between adjacent poles 17 of core 16 when the primary windings $a$–$d$ thereon are energized. In order to function in a desired manner to be hereinafter described, the peripheral surface of shaft 18 is transversely slotted to form a flat 20 on the periphery thereof within annular core 16, 17.

At its left or outer end, as viewed in FIG. 2, shaft 18 has a wind-activated vane 21 secured thereto in a novel manner which insures accurate indexing and alignment of the hubs of the shaft 18 and the vane 21. The adjacent or mating ends of shaft 18 and hub 22 of the vane have crossed V-shaped grooves 23 and 24, respectively, accurately formed therein and crossed hard metal cylindrical dowels 25, 26 (shown by construction lines in FIG. 3) are seated in said grooves. The diameter of the dowel pins 25 and 26 and the dimensions of the V-grooves 23 and 24 are such that when the hub 22 of the vane and the shaft are drawn together axially toward each other by a pair of self-locking screws 27, the dowels bottom against the walls of the grooves slightly before the plane end faces of shaft 18 and hub 22 engage. Thus, proper angular indexing of the flat 20 on shaft 18 and vane 21 is accurately determined. When two dowels 25 and 26 are used; the same are reciprocally transversely slotted in the center to permit the crossing thereof with their longitudinal axes in the same plane, and a headed pin may be extended there through and into the axis of shaft 18 to hold the dowels in position when vane 21, 22 is detached. In the alternative, separate shorter dowels may be used in each radial half of each pair of grooves. In addition to hub 22, the vane 21 comprises an arm 28 and an integral laterally extending flag portion 29. In transverse section, both the arm 28 and flag 29 are triangular, as is best seen in FIG. 1. When the device is mounted on an aircraft for determining the angle of attack thereof, the sharp or knife edge of vane 21 is the leading edge.

At its right or inner end (FIG. 2) shaft 18 has a counterweight 30 secured thereto for angular movement therewith by means of screws 31 and 32. The counterweight is calculated and arranged to balance vane 21 and minimize the effects of acceleration thereon. The counterweight also serves as a part of a train or linkage which mechanically links shafts 12 and 18 to thereby limit relative rotation thereof. Serving as a part of said linkage is a sector gear 33 mounted on ring 15 for angular movement therewith by means of screws 34 hence, on hollow shaft 12. A pin 35 is eccentrically secured to gear 33 and projects into a slightly oversize hole 36 in the counterweight 30. The difference in the diameters of hole 36 and pin 35 is preferably only sufficient to permit a relative movement of shafts 12 and 18 of about 3° maximum. Rotation of shaft 18 and hence of shaft 12 relative to casing 10 may be and preferably is limited to an arc of about 90° by any suitable fixed stop means, such as stops engageable by counterweight 30 or by sector gear 33. Said stops may be in the form of extensions from the right-hand edge of casing 10.

To prevent leakage of air, moisture, dust and the like into casing 10, a tight O-ring seal 37 is provided between the periphery of outer shaft 12 and the wall of bore 11, and the annular space within shaft 12 around the hub of shaft 18 is positively sealed by means and in a manner which do not appreciably interfere with the free and frictionless but limited angular movement of inner shaft 18. As shown, said positive annular seal is constituted by a ring 38 of impervious flexible sheet material, preferably an elastomeric material, such as polysiloxane. The outer peripheral margin of ring 38 is shown as being cemented to the inner periphery of shaft 12, and the inner peripheral margin thereof is cemented to the outer peripheral surface of shaft 18. The radial dimension of ring 38 between said margins is preferably somewhat greater than the radial distances between the surfaces to which the margins thereof are cemented in order to permit of easy torsional flexibility when one shaft rotates up to a few degrees relative to the other.

Means are provided to cause the rotatable assembly comprising outer shaft 12 and stator 16 to follow the angular movements imparted to shaft 18 by vane 21. Such means comprise a servomotor 39 which is energized, in a manner to be described, in response to relative angular movement of shaft 18 in either direction from a neutral or null position relative to shaft 21. The shaft or rotor 40 is drivably connected by a gear train G (FIG. 5) to sector 33. The shafts of the intermediate gears of the train may be utilized for driving output potentiometers, output synchros and the like an amount equal or proportional to the movement of shaft 18 from or toward a predetermined reference position.

Novel electrical circuitry associated with and controlled by the mechanism described above is diagrammatically illustrated in FIG. 7 as comprising four primary coils a—d wound on stator poles 17 of core 16 and connected in series across an AC source 41 of electrical energy. Also wound on the same poles and connected in series opposition across the input terminals of an amplifier 42 are four secondary coils A—D. Primary windings a—d are preferably equally distributed on four poles 17 and are so wound on the poles that when tne same are energized by AC source 41, pairs of adjacent poles will have the same magnetic polarity as indicated by letters N and S (FIG. 6), the magnetic flux paths being indicated by arrows. The polarities will, of course, alternate with the alternating current in the primary windings. When shaft or rotor 12, 16 is in the position illustrated in FIG. 6 with the flat surface 20 symmetrically disposed with respect to two poles 17 of like polarity, the secondary winding A and D will be equally and oppositely energized, as will also secondary windings B and C, since the two flux paths illustrated by arrows have substantially equal reluctance. There will accordingly be no resultant output signal transmitted to amplifiers 42 from the secondary windings when rotor 18 is in the null or zero position illustrated in FIG. 6.

In order to correct for manufacturing tolerances and other causes for error resulting in an inductive unbalance in the two halves of the secondary or output windings when rotor 18 is in the desired null position, means are provided for varying the distribution of input energy to the two halves a—b and c—d of the primary windings. In the form shown, said means comprises readily adjustable shunts across said halves of the primary windings for balancing both the reactive and resistive components thereof. As shown in FIG. 7, the end of the variable resistors 43 are connected to opposite ends of the primary windings a—d and the adjustable tap 44 thereof is connected through a capacitor 45 to the center tap 46 of the windings for varying the reactive component of the two halves of the winding. The resistive components of said halves are made readily variable by a variable resistor 47 connected across the primary windings and having its adjustable tap 48 connected through a fixed resistance 49 to the center tap 46 of the windings. By the adjustment of taps or slides 44 and 48 the primary winding circuits may be suitably balanced and the output of the secondary windings A—D may be thereby adjusted to zero for a reasonably wide range of positions of rotor 18 relative to stator 16.

The polarity of the output of the secondary windings will depend upon the direction of movement of rotor 18 from its null position within the stator 16, 17. This output signal is fed into amplifier 42 which may be of any suitable known construction. A frequency band pass filter comprising an inductance 50 and capacitors 51 and 52 is preferably connected between secondary windings A—D and the amplifier. The latter may be powered by source 41 through suitable rectifier means 53 of known construction. The output of amplifier 42 is connected across the control phase winding 54 of a servomotor of known construction. The fixed phase winding 55 of the motor may be connected across power source 41 through a phase shift capacitor 56. As is well known, such a servomotor operates only when the control phase winding is energized and then in a air ction dependent upon the polarity of the control phase energizing current. Thus, whenever rotor 18 rotates in either direction relative to stator 16, 17 carried by shaft or drum 12, an output signal will be generated in secondary windings A—D which in turn results in energization of the servomotor in the manner described above. As determined by the direction of movement of rotor 18 relative to stator 16, 17 and hence the polarity of the motor energizing signal, the motor shaft 40 will be driven in a direction to cause rotation, through a gear train G (FIG. 5), of outer shaft 12 and hence, of stator 16, 17 in the same direction as shaft or rotor 18 until the null relationship of the rotor 18 and stator poles 17 is reestablished or restored. Stator 16, 17 is thus caused to follow precisely and promptly such movements of shaft 18 and hence, of vane 21.

In the form shown the gear train G (FIG. 5) comprises four passes of gears operatively interposed between a gear 57 on the shaft 40 of servomotor 39 and sector gear 33 connected to the hollow outer or stator shaft 12. The gears making up the train are mounted as best seen in FIG. 5 on shafts extending between frame members 59 and 60. Drives may be taken from any of these shafts for actuating potentiometers, synchros and the like in a known manner for indicating and control purposes. The movement of each shaft or gear will be equal or proportional to movements of vane 21, and hence, of rotor 18 from a reference position and will be indicative of the direction of such movements from the reference position.

When the above-described device is used, by way of example, to measure and indicate the angle of attack of an aircraft, the same is mounted on the skin of the craft by means of a mounting flange 61 with vane 21 extending into the airstream. The device is securely mounted in a position such that when the craft is flying with zero or some other predetermined reference angle of attack, the force of the airstream will maintain vane 21 and hence, rotor 18 in a predetermined reference position, such as shown in FIGS. 1 and 2. With primary windings a—d energized by source 41, the stator 16, 17 will be moved by servomotor 39 to a corresponding reference position with rotor 18 in a null or zero output position relative to the stator, so that no signal is transmitted to the amplifier and thence to motor 39. When now the angle of attack of the craft changes, the position of the vane 21 and hence rotor 18 is maintained by the airstream while outer shaft 12 and stator 16, 17 are rotated relative thereto by the aircraft an amount equal to the change of the attack signal. In response to each such angular movement of the aircraft and stator 16, 17 relative to rotor 18, a signal is generated as above described to energize motor 39 in a manner such as to rotate stator 16, 17 relative to the aircraft and rotor 18 until the null position is reestablished.

What I claim is:

1. An electromechanical transducer comprising rotatably mounted first means, second means rotatably mounted on said first means and having a predetermined null position relative thereto, a servomotor, means drivably connecting said motor and said first means, means responsive to angular movement of one of said first and second means relative to the other from said null position to energize said motor for rotatably driving said first means relative to said second means toward said null position, whereby said first means is caused to follow the angular movements of said second means, and cooperating means on said first and second means for limiting to a few degrees the extent of angular movement of said second means from said null position in either direction relative to said first means, said motor being operative to thus drive said first means whenever said first and second means are out of null position relation.

2. A transducer as defined in claim 1 wherein said means responsive to angular movement of said second means from said null position comprises electromechanical means including coils on only one of said first and second means.

3. An electromechanical transducer comprising rotatably mounted first means, second means rotatably mounted on said first means and having a predetermined null position relative thereto, a servomotor, means drivably connecting said motor and said first means, means responsive to angular movement of one of said first and second means relative to the other from said null position to energize said motor for rotatably driving said first means relative to said second means toward said null position, whereby said first means is caused to follow the angular movements of said second means, and an annular seal between said first and second means, said seal comprising a ring of impermeable flexible material having its inner and outer peripheral edge portions each secured to one of said first and second means, whereby to form an annular barrier and permit limited relative angular movement of said first and second means in either direction.

4. A transducer as defined in claim 1 wherein the material of said ring is elastomeric.

5. A transducer as defined in claim 3 comprising cooperating means on said first and second means for positively limiting relative angular movement of said first and second means.

6. A transducer as defined in claim 1 wherein one of said first and second means includes a magnetic metal core having a plurality of circumferentially spaced poles and windings on said poles connected in series across an AC source of electrical energy and the other of said first and second means is constituted by a magnetic flux conducting member constructed to vary the distribution of magnetic flux through said poles whereby the output of said windings is varied upon angular displacement of said first or second means from said null position.

7. A transducer as defined in claim 6 comprising secondary windings on said poles connected in series opposition so as to nullify the induction of current therein by said first named windings when said first and second means are in said null position.

8. Motion-transmitting apparatus comprising a rotatable first assembly, a second assembly rotatable on and having a predetermined registry position relative to said first assembly, means for limiting relative angular movement of said assemblies, said assemblies comprising cooperable electromagnetic means for generating an electrical output signal when one of said assemblies moves angularly out of said registry position with the other said assembly, means responsive to said output signal for causing said other assembly to follow the angular movements of said one assembly to restore said registry position of the assemblies, and impermeable means forming an annular seal across the annular clearance space between said assemblies, said impermeable means having an annular portion thereof secured to each of said assemblies for angular movement therewith.

9. Apparatus as defined in claim 8 wherein said impermeable means is a ring of sheetlike elastomeric material having the inner and outer peripheral margins thereof each annularly cemented to said assembly.

UNITED STATES PATENT OFFICE
CERTIFICATE OF CORRECTION

Patent No. 3,594,741     Dated July 20, 1971

Inventor(s) Victor D. Ellison

It is certified that error appears in the above-identified patent and that said Letters Patent are hereby corrected as shown below:

Column 1, line 48, in the description of Fig. 2, "plane" should read -- plan --. Column 5, lines 21 and 26, the claim reference numeral "1", each occurrence, should read -- 3 --.

Signed and sealed this 18th day of January 1972.

(SEAL)
Attest:

EDWARD M. FLETCHER, JR.      ROBERT GOTTSCHALK
Attesting Officer     Acting Commissioner of Patents